United States Patent [19]

Guastavino

[11] Patent Number: 5,406,435
[45] Date of Patent: Apr. 11, 1995

[54] DEVICES FOR PREVENTING VIDEO CASSETTES FROM BEING INSERTED INTO A VIDEO CASSETTE RECORDER

[76] Inventor: Thomas D. Guastavino, 814 Pinewood Dr., Pottsville, Pa. 17901

[21] Appl. No.: 149,511

[22] Filed: Nov. 9, 1993

[51] Int. Cl.6 .............................................. G11B 33/02
[52] U.S. Cl. ................................................... 360/137
[58] Field of Search ..................... 360/137; 70/14, 58, 70/168

[56] References Cited

U.S. PATENT DOCUMENTS

| | | | |
|---|---|---|---|
| 4,563,673 | 1/1986 | Fechner | 360/137 |
| 4,908,728 | 3/1990 | Pinkett | 360/137 |
| 4,959,979 | 10/1990 | Filipow et al. | 70/58 |

Primary Examiner—Robert S. Tupper
Attorney, Agent, or Firm—Hugh E. Smith

[57] ABSTRACT

A device for locking up a video cassette recorder having a box with a base, a top wall and upstanding side walls, and with intermediate walls therebetween, a drum journaled through the front and rear walls at the center of the box, the drum having a centrally located diametric bore, a pair of locking rods independently supported for axial movement through apertures of an end wall and an adjacent intermediate wall, the movement being between an operative position spaced from the shaft and an inoperative position within the bore of the drum, a dial for rotating the drum extending to the exterior of the front wall, and handles to axially reciprocate each rod extending through slots in the front wall laterally offset from the drum.

4 Claims, 3 Drawing Sheets

DEVICES FOR PREVENTING VIDEO CASSETTES FROM BEING INSERTED INTO A VIDEO CASSETTE RECORDER

BACKGROUND OF THE INVENTION

1. Field of the Invention

The present invention relates to devices for precluding access to a VCR and more particularly pertains to precluding unauthorized access to the use of a VCR.

2. Description of the Prior Art

The use of lock-out devices is known in the prior art. More specifically, lock-out devices heretofore devised and utilized for the purpose of precluding access to a VCR are known to consist basically of familiar, expected, and obvious structural configurations, notwithstanding the myriad of designs encompassed by the crowded prior art which has been developed for the fulfillment of countless objectives and requirements.

The prior art discloses a large number of devices for precluding access to a VCR. By way of example, U.S. Pat. No. 4,629,089 to Federico discloses a lockable box with drop sides for enclosing a VCR.

U.S. Pat. Nos. 4,655,057 to Derman; 4,959,979 to Filipow and 4,977,762 to Dennis disclose lockable boxes positionable within a VCR.

U.S. Pat. No. Des. 329,587 to Calloway discloses a design for a VCR.

In this respect, the devices for precluding access to a VCR according to the present invention substantially depart from the conventional concepts and designs of the prior art, and in doing so provides an apparatus primarily developed for the purpose of precluding access to a VCR.

Therefore, it can be appreciated that there exists a continuing need for new and improved devices for precluding access to a VCR which can be used for precluding unauthorized use of a VCR. In this regard, the present invention substantially fulfills this need.

SUMMARY OF THE INVENTION

In view of the foregoing disadvantages inherent in the known types of VCR lockout mechanisms now present in the prior art, the present invention provides improved devices for precluding access to a VCR. As such, the general purpose of the present invention, which will be described subsequently in greater detail, is to provide new and improved devices for precluding unauthorized access to a VCR and method which have all the advantages of the prior art and none of the disadvantages.

To attain this, the present invention essentially comprises a device for locking up a video cassette recorder comprising, in combination, a rectangular box having a base, upstanding side walls and a removable top wall with intermediate walls parallel with the end walls offset from the center of the box, a drum journaled through the front and rear walls at the center of the box, the drum having a centrally located diametric bore extending therethrough, a pair of locking rods independently supported for axial movement through apertures of an end wall and an adjacent intermediate wall, the movement being between an operative position spaced from the drum and an inoperative position within the bore of the drum, a central dial for rotating the drum extending to the exterior of the front wall, handles to axially reciprocate each rod extending through slots in the front wall laterally offset from the drum, an exposed locking mechanism located within the front face of the dial, and an electrical contact to signal when the dial has locked the apparatus by illuminating a light in response thereto.

There has thus been outlined, rather broadly, the more important features of the invention in order that the detailed description thereof that follows may be better understood and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of descriptions and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent of legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide new and improved device for precluding access to a VCR which have all the advantages of the prior art VCR lock-out mechanisms and none of the disadvantages.

It is another object of the present invention to provide new and improved device for precluding access to a VCR which may be easily and efficiently manufactured and marketed.

It is further object of the present invention to provide new and improved devices for precluding access to VCR's which are of durable and reliable constructions.

An even further object of the present invention is to provide new and improved devices for precluding access to VCR's which are susceptible of a low cost of manufacture with regard to both materials and labor, and which accordingly are then susceptible of low prices of sale to the consuming public, thereby making such devices for precluding access to a VCR economically available to the buying public.

Still yet another object of the present invention is to provide new and improved devices for precluding access to a VCR which provide in the apparatuses and methods of the prior art some of the advantages thereof, while simultaneously overcoming some of the disadvantages normally associated therewith.

Still another object of the present invention is to preclude unauthorized access to a VCR.

Lastly, it is an object of the present invention to provide new and improved device for locking up a video cassette recorder comprising, a box having a base, a top wall and upstanding side walls, and with intermediate walls therebetween, a drum journaled through the front and rear walls at the center of the box, the drum having a centrally located diametric bore, a pair of locking rods independently supported for axial movement through apertures of an end wall and an adjacent intermediate wall, the movement being between an operative position spaced from the shaft and an inoperative position within the bore of the drum, a dial for rotating the drum extending to the exterior of the front wall, and handles to axially reciprocate each rod extending through slots in the front wall laterally offset from the drum.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

The same reference numerals refer to the same parts through the various Figures.

DESCRIPTION OF THE PREFERRED EMBODIMENT

Figure 1:
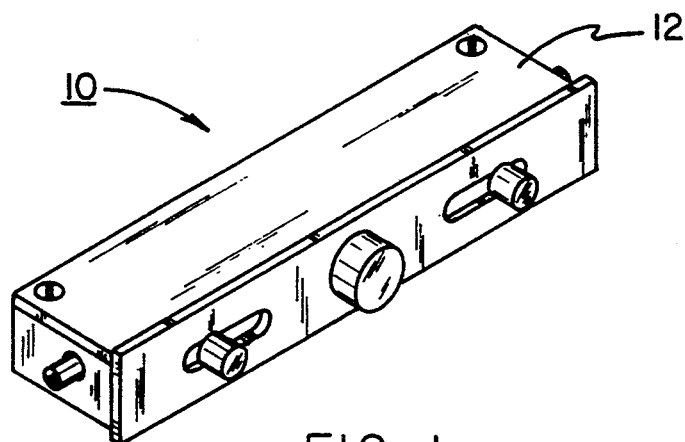
FIG. 1 is a perspective view of the preferred embodiment of the devices for precluding access to a VCR constructed in accordance with the principles of the present invention.

With reference now to the drawings, and in particular to FIG. 1 thereof, the preferred embodiment of the new and improved device for precluding access to a VCR embodying the principles and concepts of the present invention and generally designated by the reference numeral 10 will be described.

Figure 2:
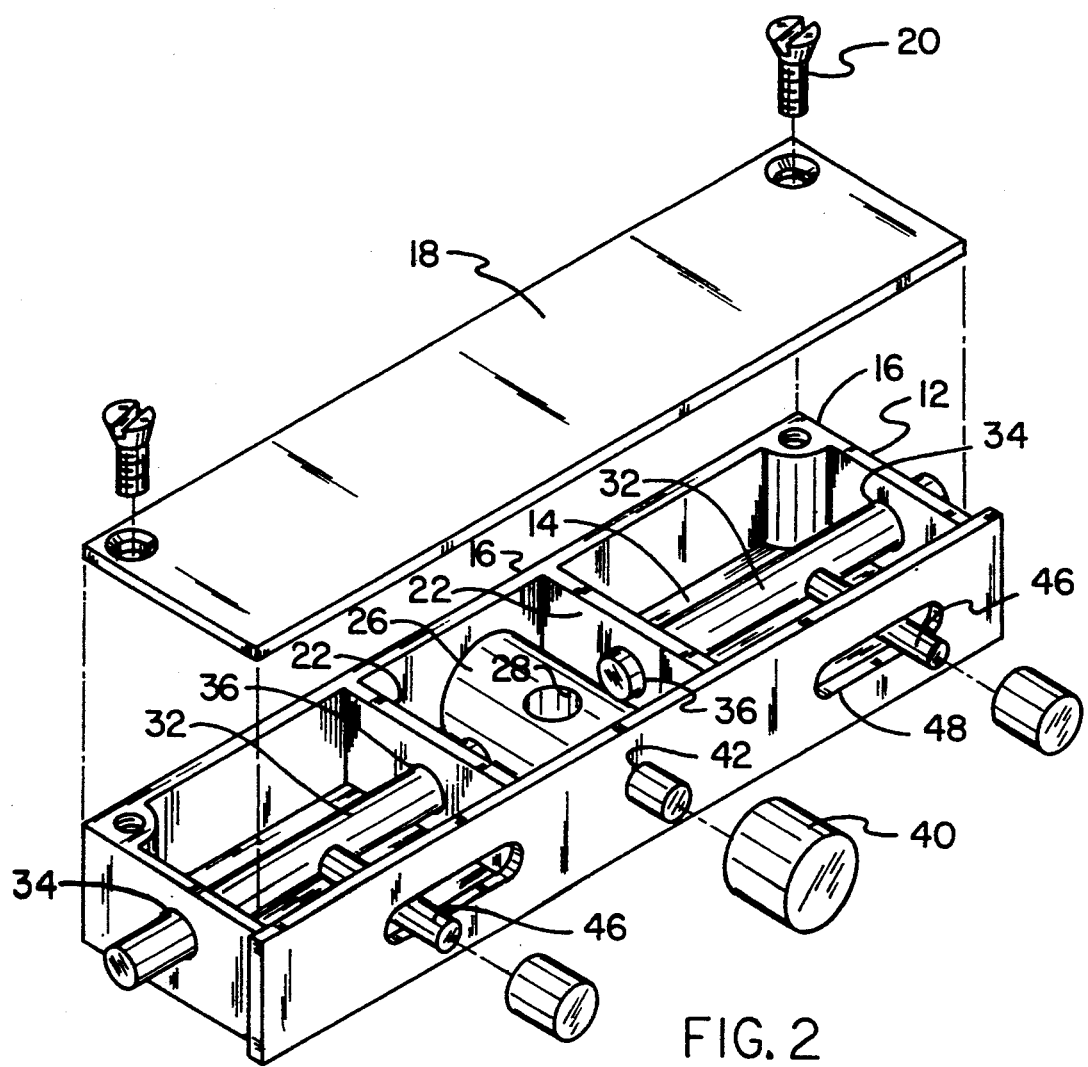
FIG. 2 is an exploded perspective view of the device as shown in FIG. 1.

As can be seen with particular reference to FIGS. 1 and 2, the present invention is in a system 10, the principle component of which is a rectangular box 12. The box 12 has a planar rectangular base 14 with rectangular side walls 16 which extend upwardly from the edges of the base 14. A top wall 16 is removably secured thereto by bolts 20. Intermediate vertical walls 22 are provided within the box. The intermediate vertical walls 22 are parallel with the end walls and perpendicular to the front and back walls. Such intermediate walls are laterally offset from the center of the box.

Journaled through the front and rear walls for rotational movement is a drum 26. The drum 26 is journaled for rotation through holes in the front and back walls. It has a centrally located diametric bore 28. Such bore extends through the drum.

Cooperable with the box and drum are a pair of locking rods 32. The locking rods have their outboard ends slidably received in holes 34 formed in the opposed end walls. The inboard ends of the locking rods are slidably received in holes 36 of the opposed intermediate walls. Movement of the locking rods is between an operative locked position wherein the rods are spaced from the drum 26, to a greater distance outwardly of the end walls for locking into a VCR opening and an inoperative unlocked position wherein the inboard ends of the locking rods are within the bore 28 of the drum to allow the device to be pushed into and out of the VCR opening.

Extending forwardly of the drum is a central dial 40. The dial 40 is rotatable in a hole 42 extending through the front wall of the container 12. The function of the dial is to rotate the drum between the operative and inoperative orientations.

Movement of the locking rods is through handles 46. The handles extend through slots 46 in the front wall. The slots are of sufficient length to allow movement of the locking rods between the operative position where they extend outwardly and the inoperative position where the rods are retracted.

Figure 3:
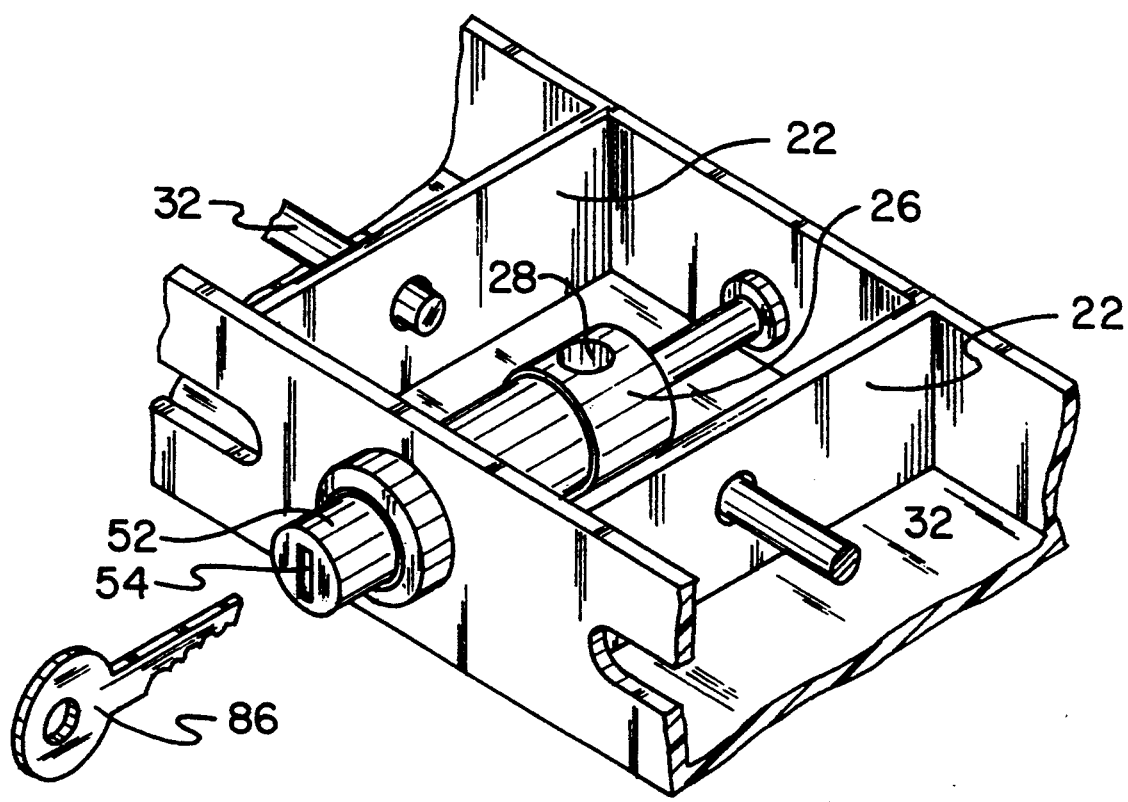
FIG. 3 is a perspective view of the central portion of a device for precluding access to a VCR constructed in accordance with an alternate embodiment of the invention.
Figure 4:
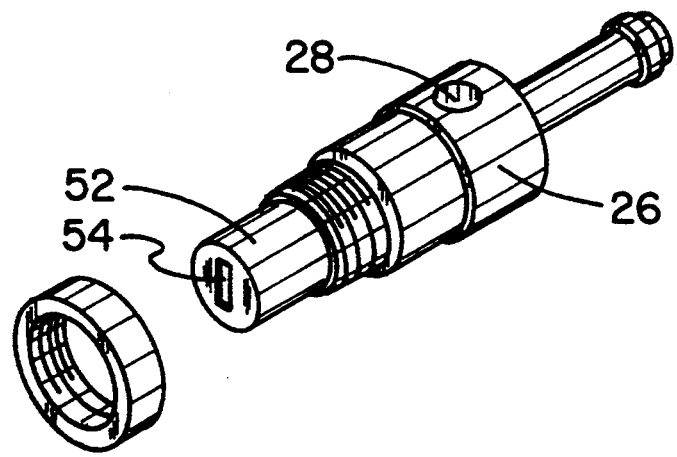
FIG. 4 is an exploded perspective view of the locking components of FIG. 3.
Figure 6:
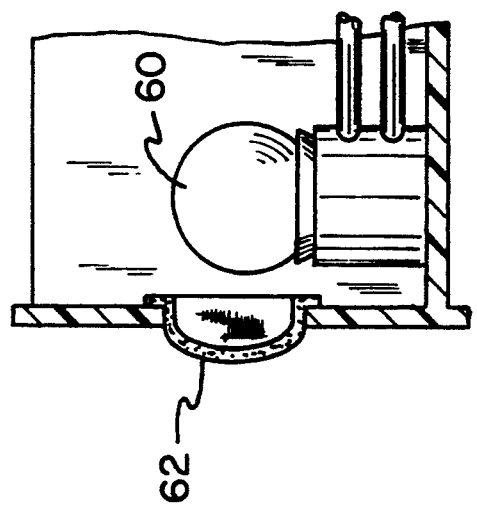
FIG. 6 is a sectional view of the device of the prior Figure taken along line 6—6 of FIG. 5.

An alternate embodiment of the invention is shown in FIGS. 3 and 4. Such alternate embodiment utilizes a lock 52 formed in the exposed exterior front end of the dial 40. A slot 54 in the lock 52 is provided to allow the key 56 to enter the slot 54 or to be removed therefrom in order to lock and unlock the drum and system so that it may be maintained in any desired orientation.

Figure 5:
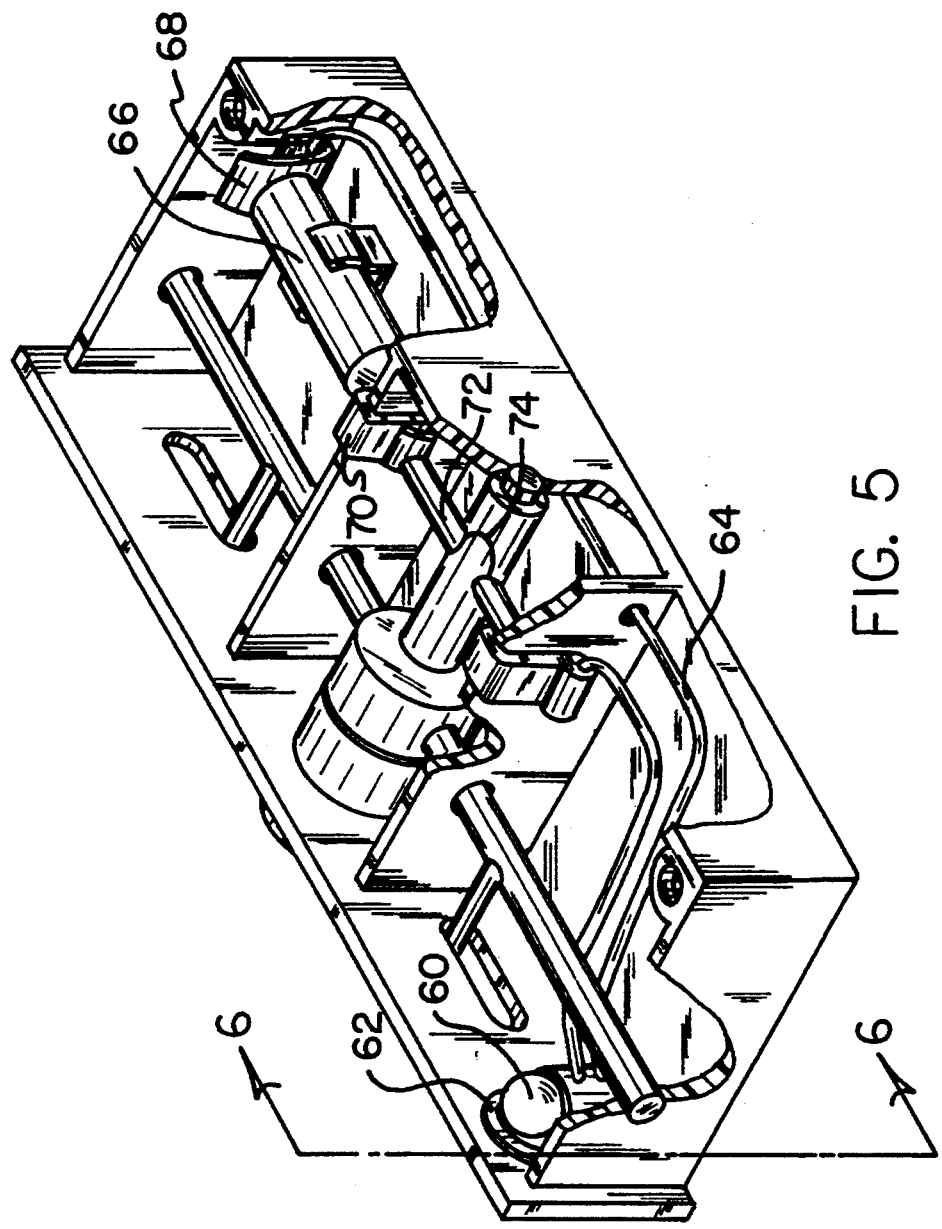
FIG. 5 is a perspective view with parts broken away of a device for precluding access to a VCR constructed in accordance with another alternate embodiment of the invention.

The last embodiment of the invention is shown in FIGS. 5 and 5. Such embodiment utilizes a light bulb 60 within the box to indicate when the device is locked and in use. The light when illuminated may be viewed through a lens 62 formed in the exterior of the front wall. Electrical lines 64 couple the light bulb with a source of current preferably in the form of a battery 66. One contact 68 always couples one pole of the battery to the light source. A second contact 70 is made to close the circuit when the drum is rotated to the locking orientation. At such time an electrically conducted components 72 on the drum 26 couples electrical components in the line of the circuit to close the circuit and light the light bulb. Rotation of the drum to the unlocked orientation moves electrically conductive component out of the circuit to open the circuit and turn off the light bulb.

The present invention is placed in the chamber of a video cassette recorder into which a cassette tape is inserted to be played or recorded so as to make the VCR completely inaccessible. When the lock is in place the opening into the unit is blocked so that children cannot insert foreign objects or reach into the chamber to cause any damage. The VCR's are very expensive and the cassette entrance provides access to vital components like the drive system, the reading heads, the ejection mechanism, and other items. It is not unusual for recorders to be sufficiently damaged by children reaching into the opening to make the cost of repair sufficiently excessive to warrant the purchase of a new unit.

The present invention is rectangular in shape, fitting closely into the opening. It contains a drum in its center which is similar to those used in key locks. When a knob on the drum is rotated through a 90 degree arc, locking pins slide out from each side and move behind the panel in the recorder, effectively preventing the lock from being removed. Nothing can be inserted into the opening when the lock is in place. Rotating the knob in the reverse direction retracts the sliding pins into the block, allowing it to be removed so the recorder can be used. The method of operating the lock can be concealed or made more deceptive in several ways, such as by requiring the insertion of a key to rotate the knob.

The present invention is made of plastic to minimize the cost. Critical components like the pins and cams are made of very high strength compounds which can withstand considerable force.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by LETTERS PATENT of the U.S. is as follows:

1. A device for preventing video cassettes from being inserted into a video cassette recorder comprising, in combination:

a rectangular box having a rectangular base with front and rear walls and opposed side walls extended upwards from the base, a pair of spaced parallel intermediate walls perpendicularly coupled between the front and rear walls and extended upwards from the base with the intermediate walls laterally offset about the center of the box, a rectangular and removable top wall, a pair of horizontal slots with one slot disposed through the front wall at a location between one intermediate wall and the adjacent side wall and the other slot disposed through the front wall at a location between the other intermediate wall and the adjacent side wall, and a first pair and a second pair of aligned apertures with an aperature of the first pair disposed through a sidewall and the other aperature of the first pair disposed through the adjacent intermediate wall and with an aperature of the second pair disposed through the other sidewall and the other aperature of the second pair disposed through the adjacent intermediate wall;

a drum disposed within the box between the intermediate walls and journaled through the front and rear walls at the center of the box, the drum having a centrally located diametric bore extended therethrough;

a pair of locking rods, each locking rod having an inboard end and an outboard end, one locking rod of the pair disposed within the first pair of apertures and the other locking rod of the pair disposed within the second pair of apertures, each locking rod independently reciprocative for slidable axial movement within the respective pair of apertures, with movement of the locking rods being between an operative locked position wherein the inboard ends are offset from the bore of the drum and the outboard ends are extended away from the box for locking the box into a video cassette recorder opening and an inoperative unlocked position wherein the inboard ends are disposed within the bore of the drum and the outboard ends are retracted towards the box for allowing the box to be inserted into and removed from a video cassette recorder opening;

a central dial axially coupled to the drum and extended outward from the front wall of the box, the dial used for rotating the drum to an operative orientation for allowing the locking rods to be positioned in an operative locked position and for rotating the drum to an inoperative orientation for allowing the locking rods to be positioned in an inoperative unlocked position;

a pair of handles offset from the drum, each handle coupled to a separate long rod and extended outwards through an adjacent slot, each handle utilized for reciprocating a separate locking rod;

key-receivable locking means associated with the drum and extended from the dial for securing the dial in an operative orientation;

a lens extended from the front wall of the box; and an electrical circuit disposed within the box for providing a visual indication of drum orientation with the circuit further comprising:

a light source positioned near the lens and providing light therethrough when energized;

a battery for providing electrical energy having a first contact and a second contact with the first contact coupled to the light source; and an elongated and electrically conductive component coupled to the drum with the component having one end coupled to the light source and another end positionable against the second contact of the battery for energizing the light source when the drum is placed in an operative orientation and positionable remote from the second contact of the battery for de-energizing the light source when the drum is placed in an inoperative orientation.

2. A device for preventing video cassettes from being inserted in a video cassette recorder comprising:

a box having a base with front and rear walls and opposed side walls extended upwards from the base and a pair of spaced intermediate walls extended between the front and rear walls;

a drum disposed within the box between the intermediate walls and journaled through the front and rear walls at the center of the box, the drum having a diametric bore;

a pair of locking rods, each locking rod having an inboard end and an outboard end, one locking rod of the pair extended through a sidewall and the adjacent intermediate wall for slidable movement therebetween and the other locking rod of the pair extended through the other sidewall and the adjacent intermediate wall for slidable movement therebetween, with reciprocal movement of the locking rods being between an operative locked position wherein the inboard ends are offset from the bore of the drum and the outboard ends are extended for locking the box into a video cassette recorder opening and an inoperative unlocked position wherein the inboard ends are disposed within the bore of the drum and the outboard ends are retracted for allowing the box to be inserted into and removed from a video cassette recorder opening;

a dial coupled to the drum and extended from the box, the dial used for rotating the drum to an operative orientation for allowing the locking rods to be positioned in an operative locked position and for rotating the drum to inoperative orientation for allowing the locking rods to be positioned in an inoperative unlocked position; and handles extended from the box to axially reciprocate each locking rod.

3. The device as set forth in claim 2 and further including:

key-receivable locking means associated with the drum and dial for securing the dial in an operative orientation.

4. The device as set forth in claim 2 and further including:

a lens extended from the box; and an electrical circuit disposed within the box for providing a visual indication of drum orientation with the circuit further comprising:

a light source positioned near the lens for providing light therethrough when energized;

a battery for providing electrical energy having a first contact and a second contact with the first contact coupled to the light source; and an elongated and electrically conductive component coupled to the drum with the component having one end coupled to the light source and another end positionable against the second contact of the battery for energizing the light source when the drum is placed in an operative orientation and positionable remote from the second contact of the battery for de-energizing the light source when the drum is placed in an inoperative orientation.

* * * * *